(12) United States Patent  (10) Patent No.: US 7,437,241 B2
Jung et al.  (45) Date of Patent: Oct. 14, 2008

(54) NAVIGATION SYSTEM FOR RESTRICTIVELY OUTPUTTING WARNING AND WARNING GENERATING APPARATUS AND METHOD FOR RESTRICTIVELY OUTPUTTING WARNING IN A NAVIGATION SYSTEM

(75) Inventors: Sang-Yoon Jung, Yongin-shi (KR); Chul-Hwan Lee, Yongin-shi (KR)

(73) Assignee: Samsung Electronics Co., Ltd (KR)

( * ) Notice: Subject to any disclaimer, the term of this patent is extended or adjusted under 35 U.S.C. 154(b) by 645 days.

(21) Appl. No.: 10/757,955

(22) Filed: Jan. 14, 2004

(65) Prior Publication Data

US 2004/0199326 A1  Oct. 7, 2004

(30) Foreign Application Priority Data

Apr. 4, 2003  (KR) ...................... 10-2003-0021226

(51) Int. Cl.
    *G08G 1/09* (2006.01)
(52) U.S. Cl. ........................................ 701/211; 180/168
(58) Field of Classification Search ............. 701/93–95, 701/117, 207, 208, 213, 119; 180/170, 171, 180/168; 340/901, 905, 902, 907, 929, 936; 123/351; 342/357.13, 357.17
    See application file for complete search history.

(56) References Cited

U.S. PATENT DOCUMENTS

| 5,315,295 | A |   | 5/1994  | Fujii |
| 5,432,509 | A | * | 7/1995  | Kajiwara ..................... 340/903 |
| 5,757,949 | A | * | 5/1998  | Kinoshita et al. ........... 382/104 |
| 6,285,923 | B1 | * | 9/2001  | Matsuda et al. ................ 701/1 |
| 6,314,369 | B1 |   | 11/2001 | Ito et al. |
| 6,424,904 | B1 | * | 7/2002  | Takahashi et al. ............. 701/70 |
| 6,675,085 | B2 | * | 1/2004  | Straub ......................... 701/93 |
| 6,870,478 | B2 | * | 3/2005  | Yasushi et al. ........... 340/573.7 |

FOREIGN PATENT DOCUMENTS

| CN | 1154525     | 7/1997 |
| EP | 1 087 206   | 3/2001 |
| JP | 9114367     | 5/1997 |
| JP | 2001099665  | 4/2001 |
| JP | 2002181564  | 6/2002 |
| JP | 2003004465  | 1/2003 |
| WO | WO 99/49435 | 9/1999 |
| WO | WO 01/61668 | 8/2001 |

* cited by examiner

*Primary Examiner*—Dalena Tran
(74) *Attorney, Agent, or Firm*—The Farrell Law Firm, PC (57) ABSTRACT

A navigation system utilizing a warning generating apparatus is disclosed. The warning generating apparatus includes a data receiving unit for receiving route guidance information data and current weather/time information from an external information center; a data analyzing unit for judging whether warning data has been included in the route guidance information data outputted from the data receiving unit; a sensor for sensing a current travel speed of a movable body; a restricted warning generating unit for receiving the route guidance information data having the warning data from the data analyzing unit if the route guidance information data is judged to include the warning data, and for determining whether it will output a warning for the warning data, based on warning generation conditions stored in advance according to a kind of the warning data; and a warning/guidance output unit for outputting warning information when the warning information has been transmitted after the warning has been determined to be outputted by the restricted warning generating unit.

21 Claims, 9 Drawing Sheets

FIG.1

| LINK NUMBER (61) | TRAVEL DISTANCE (62) | ROAD TYPE (63) | TRAVEL INFORMATION (64) | WARNING FLAG (65) | WARNING DATA (66) |
|---|---|---|---|---|---|

| LINK NUMBER (61) | TRAVEL DISTANCE (62) | ROAD TYPE (63) | TRAVEL INFORMATION (64) | WARNING FLAG (65) | WARNING DATA (66) | WEATHER INFORMATION (67) |
|---|---|---|---|---|---|---|

| | WEATHER | | | SEASON | | TIME | |
|---|---|---|---|---|---|---|---|
| | SNOW | RAIN | SHINE | WINTER | SUMMER | DAY | NIGHT |
| CURVED ROAD | 2/10 | 1/10 | 0 | 2/10 | 1/10 | 0 | 1/10 |
| ICY ROAD | 3/10 | 2/10 | 0 | 1/10 | 0 | 0 | 1/10 |
| BEWARE OF FALLING ROCKS | 0 | 1.5/10 | 1/10 | 2/10 | 0 | 1/10 | 3/10 |
| AREA WHERE ACCIDENTS FREQUENTLY OCCUR | 2/10 | 2/10 | 1/10 | 2/10 | 1/10 | 1/10 | 2/10 |
| SHARP CURVE | 3/10 | 2/10 | 1/10 | 2/10 | 2/10 | 1/10 | 2/10 |

NAVIGATION SYSTEM FOR RESTRICTIVELY OUTPUTTING WARNING AND WARNING GENERATING APPARATUS AND METHOD FOR RESTRICTIVELY OUTPUTTING WARNING IN A NAVIGATION SYSTEM

PRIORITY

This application claims priority to an application entitled "Navigation System For Providing Warning Restrictedly, Apparatus And Method for Providing Warning Restrictedly In Navigation System" filed in the Korean Industrial Property Office on Apr. 4, 2003 and assigned Ser. No. 2003-21226, the contents of which are hereby incorporated by reference.

BACKGROUND OF THE INVENTION

1. Field of the Invention

The present invention relates to a navigation system. More particularly, the present invention relates to an apparatus and method for restrictively outputting a warning in a navigation system.

2. Description of the Related Art

In general, movable bodies such as ships, airplanes and cars may be provided with navigation systems. A navigation system receives radio signals which represent, for example, a latitude, a longitude and an altitude, from a plurality of satellites included in a GPS (Global Positioning System), and it calculates a current position of a movable body. Further, such a navigation system displays geographical information including the current position according to map data stored in advance. That is, such a general navigation system provides drivers with various information necessary for driving, by means of information received from the GPS; for instance, it displays on a screen a current speed of movement, a path of movement set by a driver before driving, and an optimum path to a destination.

Figure 1:
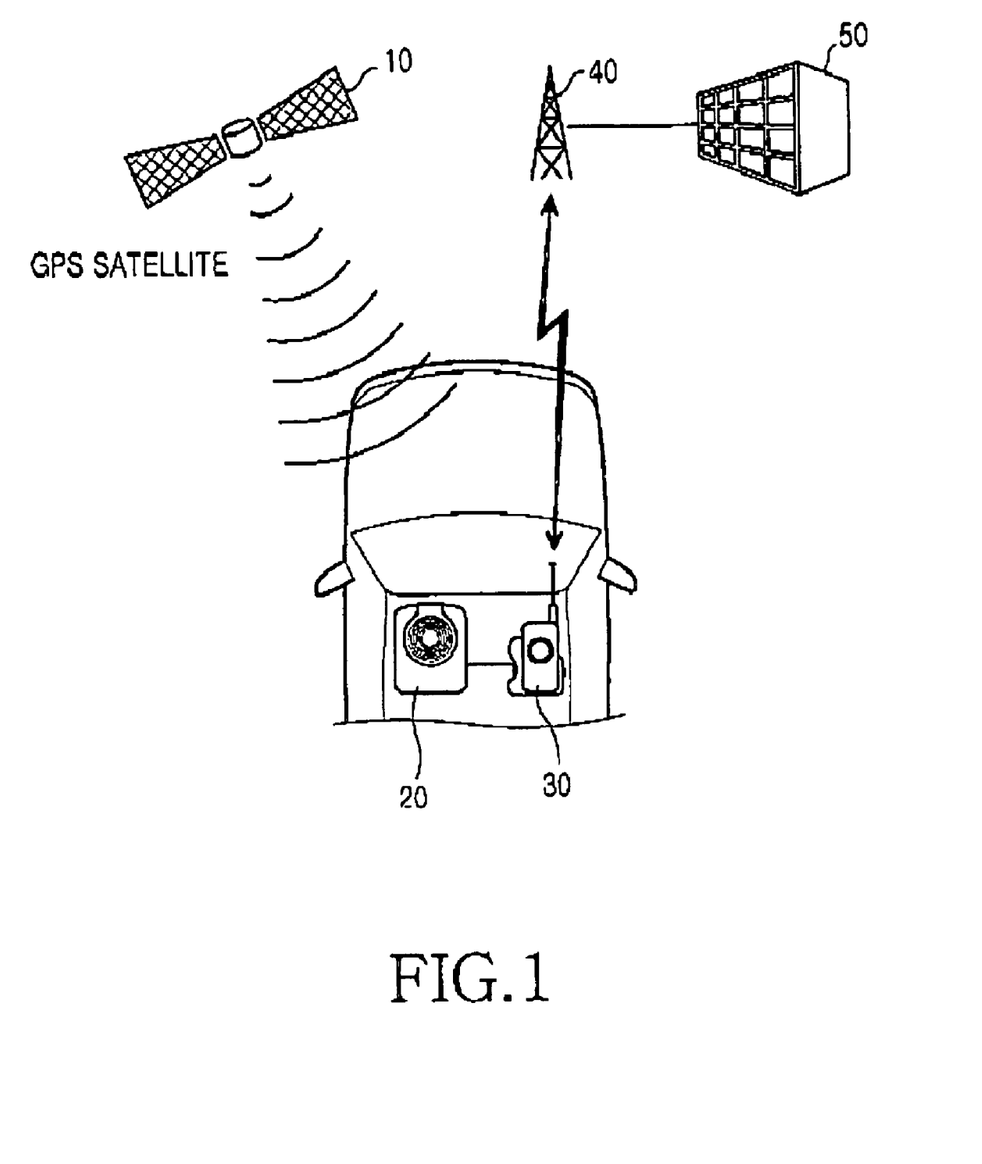
FIG. 1 is a view showing a construction of a conventional navigation system.

FIG. 1 is a view showing a construction of a conventional navigation system. Referring to FIG. 1, the navigation system includes a GPS satellite 10, a mobile terminal 30 (for instance, cell phone) communicating with a wireless network 40 and a navigation terminal 20 (for instance, a navigation kit) communicating with the GPS satellite 10 and the mobile terminal 30 in order to provide a driver with current position information and travel information of a movable body. FIG. 1 is an example of a case in which the navigation terminal 20 and the mobile terminal 30 are provided in a car.

The navigation terminal 20 receives the position information of the movable body from the GPS satellite 10 and analyzes the position of the movable body. Further, the navigation terminal 20 transmits the position information to the mobile terminal 30 in order to provide the driver with travel information corresponding to the current position of the movable body.

The mobile terminal 30 functions as an interface between the navigation system and the driver. For instance, when the driver requests current position information and information on an optimum path to a destination by means of the mobile terminal 30, the navigation system provides corresponding information to the driver through a display unit and a speaker of the mobile terminal 30.

Further, when the current position information is transmitted from the navigation terminal 20, the mobile terminal 30 receives travel information corresponding to the current position from an information server 50 connected to the mobile terminal through the wireless network 40.

In general, the information server 50 constructs the travel information in a predetermined data format such as RGI (Route Guidance Information) data, and transmits the constructed data format to the navigation terminal 20 via the mobile terminal 30. The navigation terminal 20 analyzes the data format and provides the driver with the travel information of a corresponding position. In this case, the RGI data 60 is information about a link on which the movable body is currently traveling.

Figure 2:
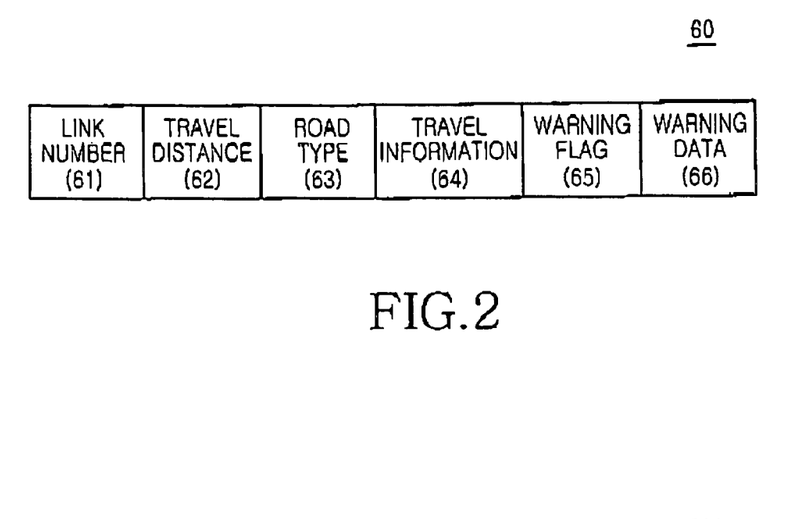
FIG. 2 is a view showing a data format of RGI data utilized in a navigation system.

FIG. 2 is a view showing a data format of the RGI data 60 utilized conventionally in a navigation system. Referring to FIG. 2, the RGI data 60 utilized conventionally in a navigation system includes a link number field 61, a travel distance field 62, a road type field 63, a travel information field 64, a warning flag field 65 and a warning data field 66. Each field stores the following information:

The link number field 61 stores an identification number of a link on which the movable body is current traveling, the travel distance field 62 stores an entire travel distance of the link, and the road type field 63 stores road types of the link such as local highway, national highway or express highway. The travel information field 64 stores travel information regarding what is in front of the movable body, such as: a left turn 200 m in front and a sharp curve 300 m in front. Further, the warning flag field 65 stores a representation of whether warning data is included in the link or not, and the warning data field 66 stores warning data information to be provided to a driver, such as: 'speed regulation' and 'be cautious of an icy road'.

The navigation terminal 20 receives the RGI data 60 transmitted from the information server 50 through the mobile terminal 30 and confirms the warning flag field 65 of the RGI data 60. From the result of the confirmation, when the warning data has been included in the corresponding RGI data 60 (i.e. the corresponding link), the navigation terminal 20 outputs a voice warning through the speaker based on the warning data stored in the warning data field 66.

When the warning data has not been included in the corresponding link, the navigation terminal 20 shows general paths using the display unit and the speaker based on the travel information stored in the travel information field 64 of the RGI data 60.

In this case, the navigation terminal 20 may output warning data according to each link by itself. For instance, the navigation terminal 20 stores a digital map, determines the current travel information of the movable body by itself and may output the warning data in accordance with a result obtained by analyzing the map information and the travel information.

However, in a conventional navigation system, when the warning data field 66 of the RGI data 60 has included warning data, or when warning data has been generated according to the map information and the travel information, a stored voice warning has been outputted regardless of a current travel state of the movable body. For instance, in the conventional navigation system, when the warning data field 66 of the RGI data 60 has included speed regulation information, a voice warning such as 'slow down the speed of a movable body to a predetermined speed' has been outputted, regardless of the current travel speed of the movable body. In more detail, when the RGI data 60 has included warning data such as 'regulation travel speed is below 60 km/h', a voice warning such as 'slow down the current travel speed of the movable body to below 60 km/h' has been outputted when the movable body has been in a corresponding region of the road, even if the current travel speed of the movable body is below 60 km/h, in the conventional navigation system. Such a voice warning announcing the speed regulation is not only unnecessary to drivers located at an area in which traffic is bumper to bumper, but also it makes the driver's mind unsettled.

Further, in the conventional navigation system enabling a voice warning to be outputted to a driver in an area having unmanned speed cameras, even if the driver has driven below the regulation speed, the voice warning has been outputted regardless of a current travel state of the movable body. This may cause the driver to jam on the brakes in fright and confusion, so that a rear-end collision accident may occur.

Further, in the prior art, a voice warning limited to a particular weather/season/time such as 'be cautious of sliding if snowing or raining' or 'low gear at night' has been outputted unconditionally, regardless of current weather/season/time. That is, since the voice warning limited to a particular weather/season/time has been outputted without considering the current weather/season/time, preferable travel information has not been provided to the driver and a travel environment grows worse due to the unnecessary voice warning. That is, since all voice warnings set in advance for a corresponding link have been outputted without considering the travel speed of the movable body and the current weather/season/time, there have been many cases in which various necessary pieces of voice-outputted information such as voice warnings, direction instructions and distances remaining according to road conditions have been overlapped by unnecessary voice warnings. Such overlapped voice information has caused drivers to be confused.

SUMMARY OF THE INVENTION

Accordingly, the present invention has been made to solve the above-mentioned problems occurring in the prior art, and a first object of the present invention is to provide a warning generating apparatus and method for preventing a driver from being confused due to an overlap of various voice guidance such as voice warnings, direction instructions and distances remaining, by omitting unnecessary voice guidance in consideration of an actual travel environment of the driver.

It is a second object of the present invention to provide a warning generating apparatus and method for improving a travel environment of the driver by generating a warning reflecting the actual travel environment of the driver such as travel speed and season/weather/time information.

It is a third object of the present invention to provide a warning generating apparatus and method for enabling a navigation system to be more effectively utilized by restrictively outputting voice guidance to a driver.

It is a fourth object of the present invention to provide a navigation system including a warning generating apparatus, which can restrictively output a warning.

In order to accomplish these objects, according to the preferred embodiment of the present invention, there is provided a warning generating apparatus comprising: a data receiving unit for receiving path data and current weather/time information from an external source and for outputting the path data and current weather/time information; a data analyzing unit for judging whether warning data has been included in the path data outputted from the data receiving unit; a sensor for sensing a current travel speed of a movable body; a restricted warning generating unit for receiving the path data from the data analyzing unit if the data analyzing unit judges that the path data includes warning data, and for determining whether it will output a warning corresponding to the warning data based on warning generation conditions stored in advance, the warning generation condition being stored according to a kind of the warning data; and a warning/guidance output unit for outputting warning corresponding to the warning data that is included in route guidance information data, when the restricted warning generating unit determines to output the warning. If the restricted warning generating unit determines to output the warning. Here and below, a kind of the warning data may be, for example, speed regulation, seasonal, weather-related, or any other type of driving hazard, obstacle, or condition.

In order to accomplish these objects, according to the preferred embodiment of the present invention, there is provided a warning generating method comprising the steps of: (1) receiving path data; (2) determining whether warning data has been included in the received path data; (3) determining a kind of the warning data when the warning data has been included in the path data; (4) determining whether a warning corresponding to the warning data will be outputted or not, based on the determined kind of the warning data and on warning generation conditions stored in advance according to the kind of the warning data; and (5) outputting the warning when it is determined to output the warning.

Further, in order to accomplish these objects, according to the preferred embodiment of the present invention, there is provided a navigation system including a warning generating apparatus which can restrictively output a warning based on actual travel environment information of a movable body.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 3:
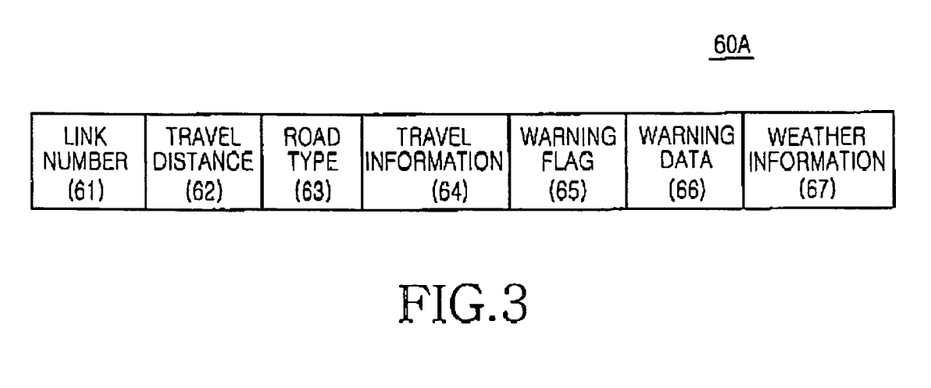
FIG. 3 is a view showing a data format of RGI data utilized in a navigation system according to the preferred embodiment of the present invention.

Referring to FIG. 3, a RGI data 60A used in a navigation system in accordance with the preferred embodiment of the present invention comprises fields such as a link number 61, a travel distance 62, a road type 63, travel information 64, warning flag 65, warning data 66 and weather information 67. Herein, the RGI data 60A further comprises the weather information field 67 in addition to a RGI data format illustrated in FIG. 2. That is, the RGI including the weather information sent by an external server is transmitted to a user. Herein, the remaining fields except for the weather information field 67 is similar to them shown in FIG. 2 and thus, the detailed description therefore is not given hereto.

Figure 4A:
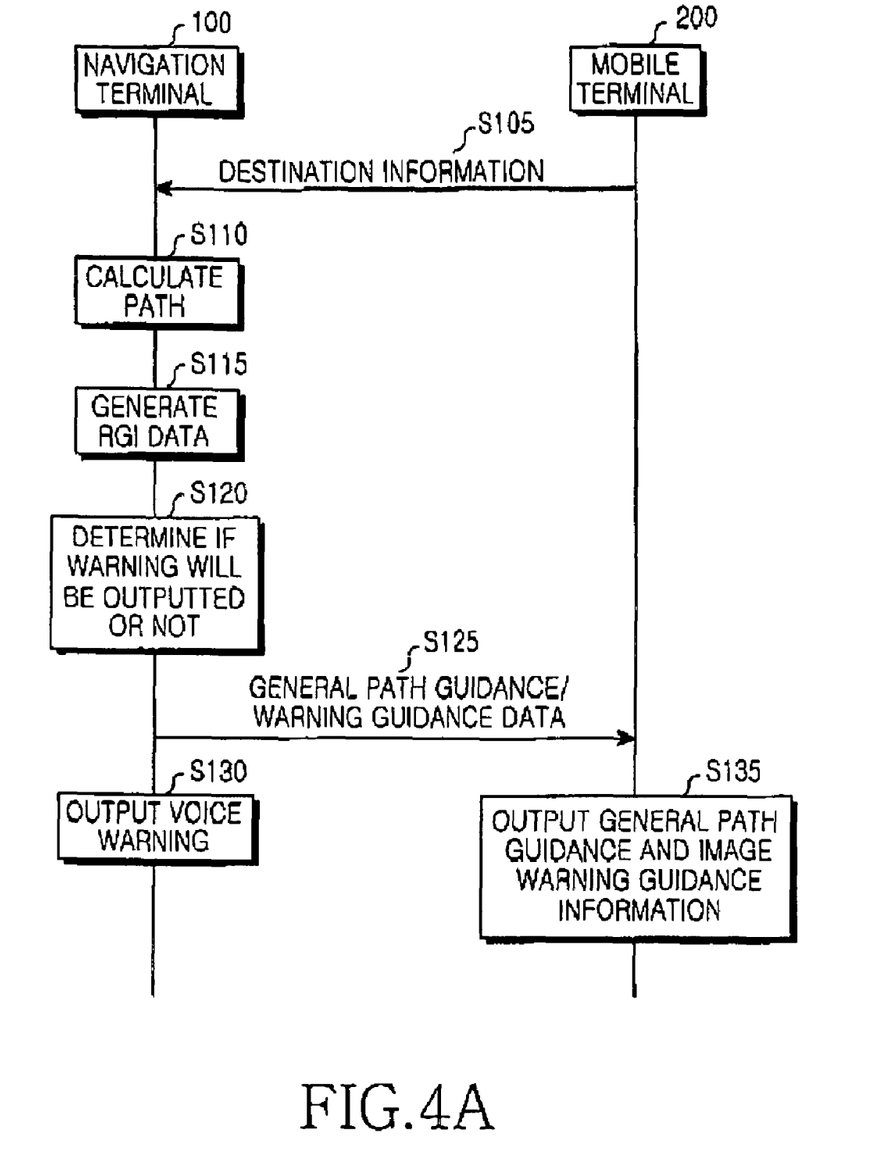
FIG. 4A shows a process performed in a navigation system for restrictively outputting a warning according to a first embodiment of the present invention.
Figure 4B:
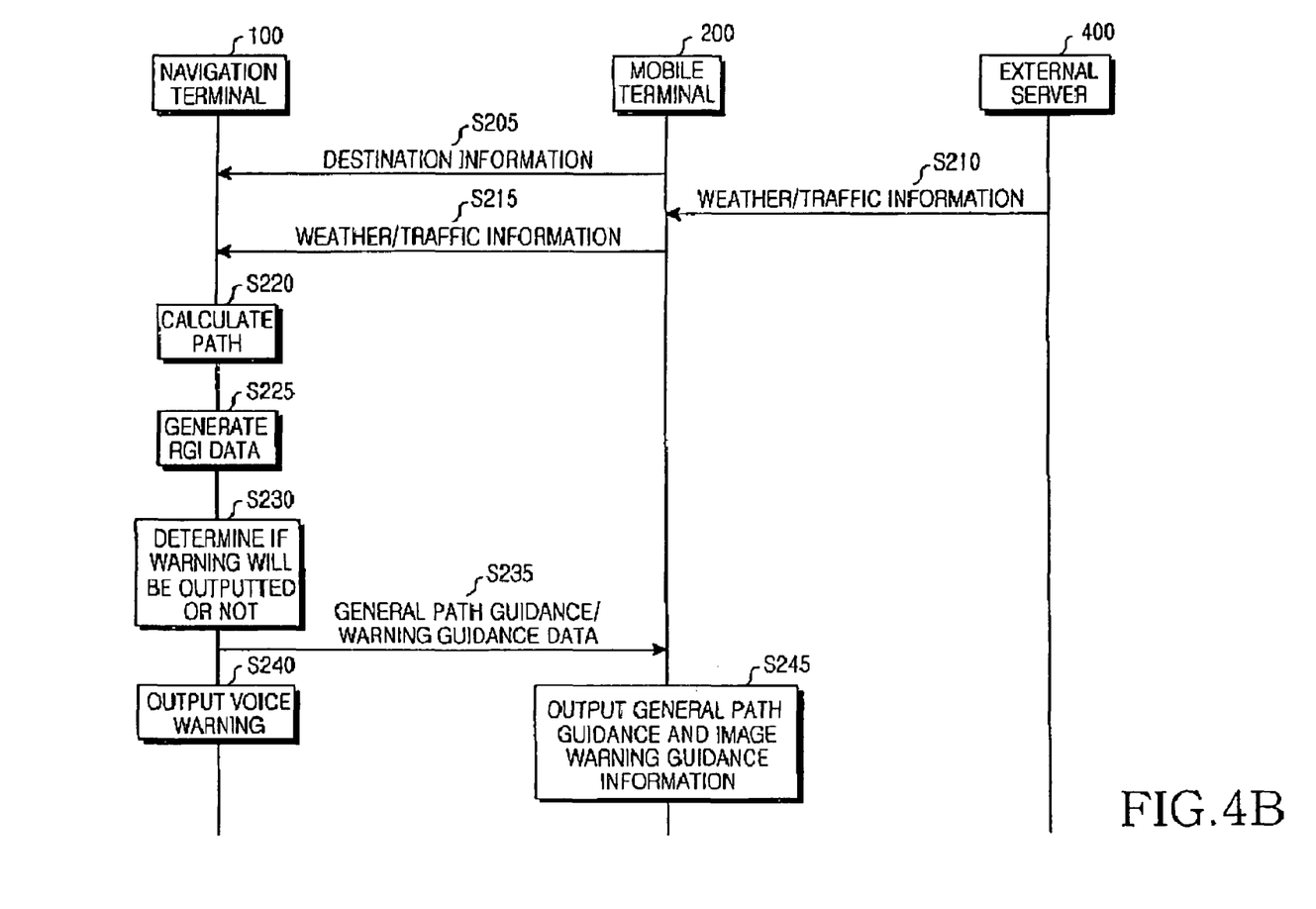
FIG. 4B shows a process performed in a navigation system for restrictively outputting a warning according to a second embodiment of the present invention.
Figure 4C:
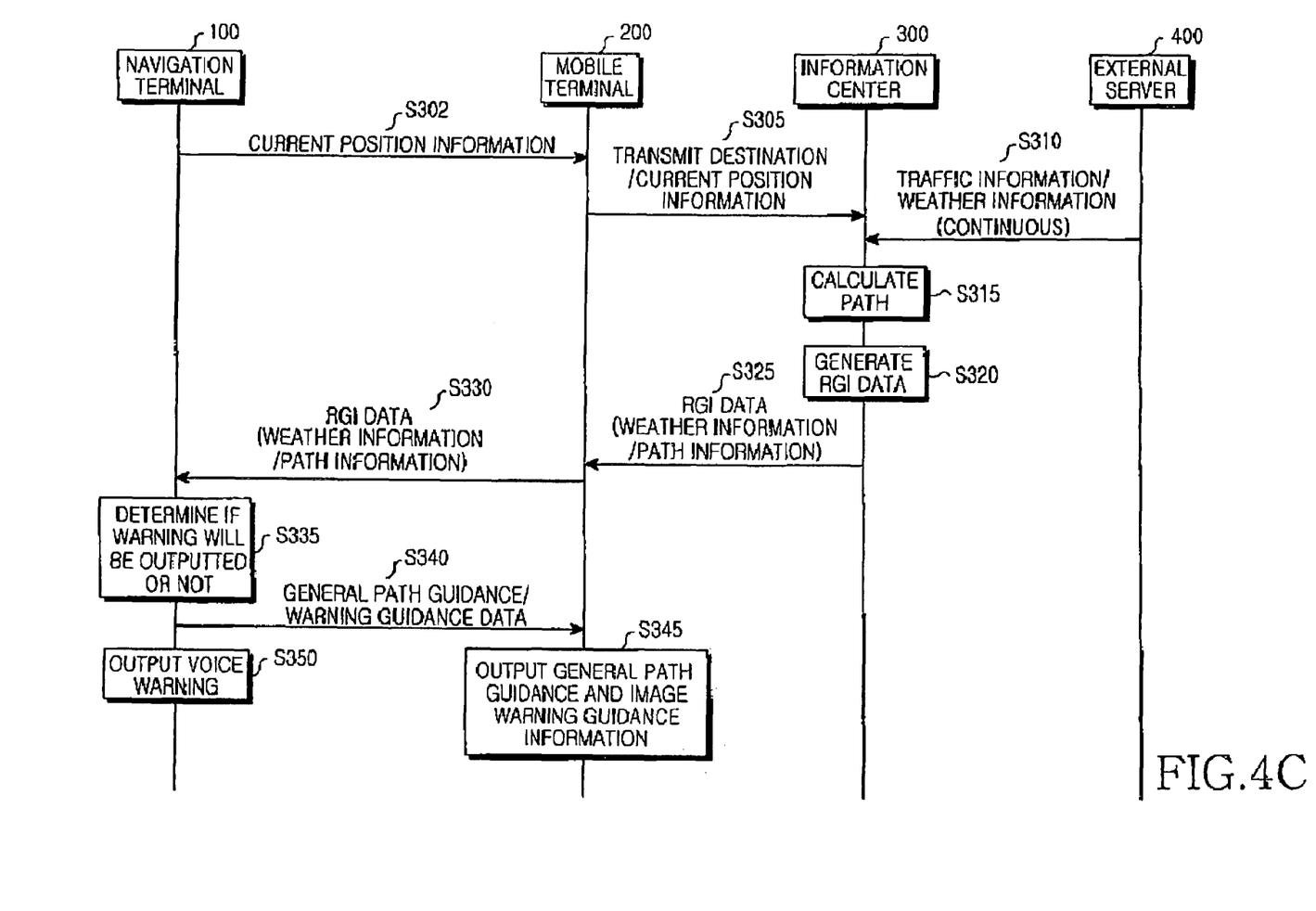
FIG. 4C shows a process performed in a navigation system for restrictively outputting a warning according to a third embodiment of the present invention.

FIGS. 4A, 4B and 4C show a process performed in a navigation system for restrictively outputting a warning according to first through third embodiments of the present invention, respectively. FIG. 4A illustrates an example of a process for restrictively outputting a warning with only stored information in a stand-alone navigation system. FIG. 4B illustrates an example of a process for restrictively outputting a warning based on calculated path information and weather/traffic information received through a wireless network in a stand-alone navigation system. FIG. 4C illustrates an example of a process for restrictively outputting a warning in a server-client navigation system.

When a user requests a path information, there is required the present position information and the destination information of the user. Herein, as to the current position information, the information detected by a position tracking device (for example, a GPS receiver) equipped in a navigation system is used or the information inputted by a user can be used in an area where it is difficult to detect the present position by the position tracking device, i.e., it is difficult to receive a GPS signal.

Referring to FIG. 4A, a process for restrictively outputting a warning according to the first embodiment of the present invention is described. In an example of FIG. 4A, a process using a navigation terminal 100, which includes a digital map and a device of detecting speed/position information of a movable body, is described.

In this case, when a user inputs a destination and current position information for a movable body is detected by a GPS receiver of a mobile terminal 200 in order to obtain optimum path information to a predetermined destination input by a user, the mobile terminal 200 transmits the destination information to the navigation terminal 100 at step S105. Next, the navigation terminal 100 detects the current position information by means of a position tracking device such as a GPS receiver, and then calculates a path to the destination transmitted in step S105 from a current position by means of a stored digital map at step S110. Further, the navigation terminal 100 generates a RGI data on the basis of the path calculation result at step S115. An example of the generated RGI data structure is shown in FIG. 3.

Further, the navigation terminal 100 compares travel information included in the RGI data with actual travel information and then determines whether the navigation terminal 100 will generate a warning or not at step S120. In order to perform step S120, a warning generation condition, set in advance, must be stored in the navigation terminal 100, and a warning generating apparatus which causes a warning to be restrictively outputted based on the warning generation condition and on the actual travel information of the movable body is embedded in the navigation terminal 100.

For instance, when the RGI data includes warning data regarding a speed regulation, the navigation terminal 100 compares the regulation speed included in the warning data with the travel speed of the movable body, and then determines to output a warning only when the travel speed of the movable body is faster than the regulation speed. In more detail, when the RGI data stores a warning data such as 'regulation travel speed is below 60 km/h', the navigation terminal 100 determines to output the warning only when the travel speed of the movable body is more than 60 km/h.

Further, as described above, when the RGI data includes warning data for a speed regulation, the warning generation condition may be separately set and the warning may be only generated when the condition is met. For instance, when the warning generation condition for the speed regulation requires that the current travel speed of the movable body be more than 10 percent faster than the regulation speed, the navigation terminal 100 checks the current travel speed of the movable body and then determines to output a warning only when the current travel speed of the movable body is more than 10 percent faster than the regulation speed.

In this case, it is preferred that the navigation terminal 100 utilize a speed sensor installed on a predetermined position of the movable body to check the current travel speed of the movable body.

If the navigation terminal 100 determines that a warning is generated in step S120, then the navigation terminal 100 transmits a general path guidance and a warning guidance information to the mobile terminal 200 at step S1125. That is, as a result of the determination in step S120, when the warning is generated, the navigation terminal 100 transmits the warning data to the mobile terminal 200 together with the general path guidance information. Next, the mobile terminal 200 outputs the general path guidance and the warning guidance information in response to the transmission of the navigation terminal 100 at step S135. Herein, since the warning data may be outputted by means of either voice data or image data, the image data included in the warning guidance information is outputted through the mobile terminal 200 in step S135 and the voice data included in the warning guidance information is outputted through the navigation terminal 100 in step S130.

When the warning is not generated in step S120, the navigation terminal 100 does not output the warning and transmits only the general path guidance information, such as a direction instruction and a distance remaining, to the mobile terminal 200.

FIG. 4B is a flow chart illustrating a process for restrictively outputting a warning according to a second embodiment of the present invention. In the second embodiment of the present invention, the navigation terminal 100 calculates an optimum path by means of an already stored digital map, and receives current weather information and current traffic information from an external server 400, such as a server managing real-time weather and traffic information, through the mobile terminal 200, so as to restrictively output a warning reflecting the weather and traffic information.

Referring to FIG. 4B, a process for restrictively outputting a warning according to a second embodiment of the present invention is described.

First, according to a request of a user, the mobile terminal 200 transmits a destination and current position information of the movable body to the navigation terminal 100 in step S205 and the navigation terminal 100 calculates a path using the destination and current position information in step S220. Steps S205 and S220 in FIG. 4B operate similarly to steps S105 and S110, respectively, as shown in FIG. 4A.

The second embodiment of the present invention shown in FIG. 4B further includes step S210 and step S215 in which the navigation terminal 100 receives current weather information and current traffic information from an external server 400, such as a server managing real-time weather and traffic information, through the mobile terminal 200. This is for restrictively outputting a warning reflecting the real-time weather and traffic information about an area including an optimum path and current position information.

The navigation terminal 100 receiving the destination information from the mobile terminal 200 in step S205 recognizes that a navigation starts, and receives the weather and traffic information from the external server 400 such as the server managing real-time weather and traffic information, through the mobile terminal 200 (S210, S215). The weather and traffic information is information which is broadcasted from the external server 400 and the navigation terminal 100 receives the information at step S215 in order to calculate a path to the destination from the current position at step S220. The navigation terminal 100 adds the weather and traffic information to the path calculation result and then generates a RGI data at step S225. An example of the generated RGI data structure is as shown FIG. 3.

Further, the navigation terminal 100 determines at step S230 whether it will generate a warning or not using the real-time weather and traffic information included in the RGI data generated in step S225. That is, the navigation terminal 100 compares the warning generation condition set in advance with actual travel environment information and then determines whether it will generate the warning or not. In order to perform step S230, the navigation terminal 100 has a warning generating apparatus which stores the warning generation condition set in advance and which causes the warning to be restrictively outputted based on the warning generation condition.

For instance, when the RGI data includes warning data regarding a speed regulation, the navigation terminal 100 compares the regulation speed included in the warning data with the travel speed of the movable body and determines whether the navigation terminal 100 will generate a warning. The above description of FIG. 4A explains a case in which the navigation terminal 100 causes the warning to be restrictively outputted based on the warning data regarding the speed regulation included in the RGI data. Accordingly, in the description of FIG. 4B, description of a case in which the RGI data includes warning data regarding a speed regulation is omitted.

Also, the navigation terminal may be integrated with the mobile terminal. For instance, a communication module may be embedded in the navigation terminal so that the communication module enables the navigation terminal to transmit/receive various information from an information center or an external server.

Further, use of the mobile terminal as a medium which transmits/receives various information from an external information center and various communication modules is only one example of a system in which the method can be employed. For instance, the mobile terminal can transmit/receive various information by means of DSRC (dedicated short range communications) and a communication module which can receive a FM (frequency modulation) broadcasting frequency. Accordingly, the mediums which transmit/receive the information from the external information center are not limited to only mobile communication terminals.

When the warning data stored in the RGI data is limited to a particular weather/season/time, such as 'be cautious of sliding if snowing or raining' or 'low gear at night', the navigation terminal 100 checks current weather/season/time information and determines to output the warning only when the current weather/season/time information agrees with the weather/season/time for generating the warning data. For this, it is preferred that the navigation terminal 100 receives the current time information and the current weather information from the mobile terminal 200, so as to check the time on the basis of the time information, and so as to check the current weather information using the real-time weather information transmitted from the mobile terminal 200.

For this, the navigation terminal 100 has the warning generation condition set in advance and has the warning generating apparatus which causes the warning to be restrictively outputted based on the warning generation condition and on actual travel environment information of a movable body such as travel speed, weather information and traffic information.

As described above, the navigation terminal 100 determines whether it will generate the warning in step S230 and then transmits a general path guidance and warning data to the mobile terminal 200 based on the determination result at step S235. That is, as a result of the determination in step S230, when the warning is generated, the navigation terminal 100 transmits the warning data to the mobile terminal 200 together with the general path guidance information. Next, the mobile terminal 200 outputs the general path guidance and warning guidance information in response to the transmission of the navigation terminal 100 at step S245. Because the warning data may be outputted by means of either voice data or image data, the image data of the warning guidance information is outputted through the mobile terminal 200 in step S245 and the voice data of the warning guidance information is outputted through the navigation terminal 100 in step S240.

As a result of the determination in step S230, when the warning is not generated, the navigation terminal 100 does not output the warning and transmits the only general path guidance information, such as direction instruction and a distance remaining, to the mobile terminal 200.

FIG. 4C illustrates a process for restrictively outputting a warning according to a third embodiment of the present invention. In the third embodiment of the present invention, a navigation terminal 100 receives current weather information and path guidance information to a destination from a current position from an external information center 300 and then outputs restrictively a warning reflecting the weather and traffic information.

Referring to FIG. 4C, when a user inputs a destination and current position information to a mobile terminal 200 in order to obtain optimum path information to the destination, the mobile terminal 200 transmits the destination and current position information to an information center 300 at step S305. Next, the information center 300 calculates at step 315 a path to the destination from a starting position which has been inputted by the user, such as a current position, using traffic information and weather information continuously transmitted from an external server 400, such as a server managing real-time weather and traffic information, at step S310, and then generates a RGI data at step S320. Herein, the information center 300 may transmit the RGI data including the current weather information transmitted from the external server 400. The data format of the RGI data 60A including weather information is shown in FIG. 3.

The information center 300 generating the RGI data transmits the RGI data to the navigation terminal 100 (step S330) via the mobile terminal 200 (step S325).

Next, the navigation terminal 100 analyzes the received RGI data and then determines whether it will generate a warning or not at step S335. That is, the navigation terminal 100 compares a warning generation condition set in advance with actual travel environment information such as a travel speed, weather information and traffic information and then determines whether the navigation terminal 100 will generate the warning or not. For this, the navigation terminal 100 stores the warning generation condition set in advance and a warning generating apparatus which causes the warning to be restrictively outputted based on the warning generation condition.

For instance, when warning data included in the RGI data is speed regulation information, the navigation terminal 100 compares a speed mandated by the speed regulation information with a current travel speed of a movable body and determines to output a warning only when the travel speed of the movable body is faster than the speed mandated by the speed limit information (hereinafter referred to as a 'regulation speed'). In more detail, when the RGI data stores a warning data such as 'regulation speed is 60 km/h', the navigation terminal 100 only determines to output a warning such as 'decrease the travel speed of the movable body to below 60 km/h' in a corresponding area when the travel speed of the movable body is more than 60 km/h. That is, when the RGI data stores a warning data such as 'regulation speed is 60 km/h', the navigation terminal 100 determines not to output the warning if the travel speed of the movable body is less than 60 km/h.

Further, when the warning data is a speed regulation warning, the warning generation condition may be set separately and the warning may be generated only when the condition is met. For instance, when the warning generation condition requires that the current travel speed of the movable body be more than 10 percent faster than the regulation speed, the navigation terminal 100 checks the current travel speed of the movable body and whether the warning data for the speed regulation is stored or not. Next, the navigation terminal 100 only determines to output a warning such as 'decrease the travel speed of the movable body to below regulation speed of 60 km/h' in a corresponding area when the travel speed of the movable body is more than 10 percent faster than the regulation speed.

Put differently, when the warning generation condition requires that the current travel speed of the movable body be more than 10 percent faster than the regulation speed, and when the RGI data stores the warning data such as 'regulation speed is 60 km/h', the navigation terminal 100 determines to output the warning only when the travel speed of the movable body exceeds 66 km/h, and determines not to output the warning when the travel speed of the movable body is less than 66 km/h.

In this case, it is preferred that the navigation terminal 100 utilize a speed sensor installed on a predetermined position of the movable body, so as to check the current travel speed of the movable body.

When the warning data stored in the RGI data is limited to a particular weather/season/time such as 'be cautious of sliding if snowing or raining' or 'low gear at night', the navigation terminal 100 checks current weather/season/time information and then only determines to output the warning when the current weather/season/time information agrees with the weather/season/time for generating the warning data. For this, it is preferred that the navigation terminal 100 receives the current time information and the current weather information from the mobile terminal 200, so as to check the time based on the time information, and so as to check the current weather information using the real-time weather information transmitted from the mobile terminal 200. Further, it is preferred that the navigation terminal 100 judges the current weather information based on the weather information included in the RGI data.

In an example of FIG. 4C, a case in which the information center 300 includes the current weather information while generating the RGI data has been described. However, the mobile terminal 200 can judge the current weather information by means of weather information received from a weather server after connecting the separate weather server through a wireless network.

The navigation terminal 100 determines whether it will generate the warning or not in step S335 and then transmits a general path guidance and warning data to the mobile terminal 200 in step S340 according to the determination result from step S335. That is, as a result of the determination in step S335, when actual travel environment information satisfies a warning generation condition set in advance, the navigation terminal 100 determines to output the warning and then transmits the warning data to the mobile terminal 200 together with the general path guidance information at step S340. Next, the mobile terminal 200 outputs the general path guidance and the warning guidance information in response to the transmission of the navigation terminal 100 in step S345. Herein, since the warning data may be outputted by means of either of voice data and image data, the image data of the warning guidance information is outputted through the mobile terminal 200 in step 345 and the voice data of the warning guidance information is outputted through the navigation terminal 100 in step S350.

If the warning data is not transmitted from the navigation terminal 100, the mobile terminal 200 does not output the warning and instead outputs the general path guidance, such as a direction instruction and a distance remaining.

Figure 5A:
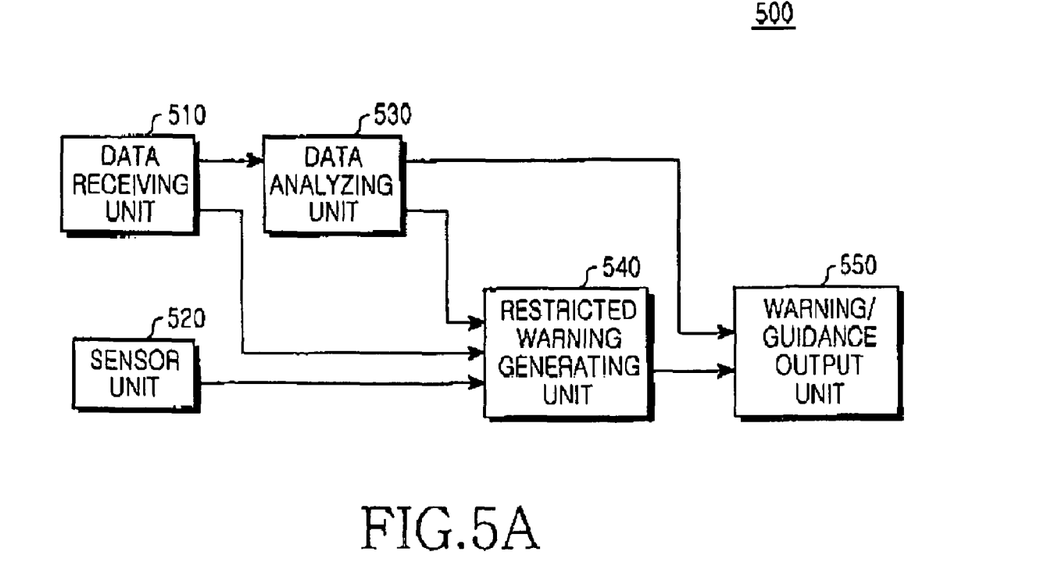
FIG. 5A is a view showing a schematic construction of a warning generating apparatus for restrictively outputting a warning according to the first through third embodiments of the present invention.

FIG. 5A is a view showing a schematic construction of a warning generating apparatus 500 for restrictively outputting a warning according to the first through third embodiments of the present invention. It is preferred that such a warning generating apparatus 500 is embedded in the navigation terminal 100.

Referring to FIGS. 4A to 4C and FIG. 5A, the warning generating apparatus 500 according to an embodiment of the present invention includes a data receiving unit 510, a sensor 520, a data analyzing unit 530, a restricted warning generating unit 540 and a warning/guidance output unit 550.

The data receiving unit 510 receives RGI data and current time information, such as year/month/date/hour/minute/second, from an external information center in order to determine actual travel environment information of a movable body, such as travel speed, weather information and traffic information. The data receiving unit 510 can determine the current time and season information on the basis of such a current time information. Also, when RGI data including the weather information has been received, the data receiving unit 510 analyzes the RGI data in order to determine the current weather information. When the received RGI data does not include weather information, the data receiving unit 510 receives the current weather information from a separate weather server. Example data formats of such a RGI data are shown in FIG. 2 and FIG. 3. An example of the data format of the RGI data which does not include the weather information is shown in FIG. 2 and an example of the data format of the RGI data which includes the weather information is shown in FIG. 3. Since the data format has been described in detail with reference to FIG. 2, a description for the data format of the RGI data is omitted.

Also, as in the embodiment of FIG. 4C, when the navigation terminal 100 receives the RGI data generated in the information center 300, the data receiving unit 510 may receive the RGI data and the current time information from the mobile terminal 200. As in the embodiments of FIGS. 4A and 4B, when the navigation terminal 100 generates the RGI data, the data receiving unit 510 may receive the RGI data from the navigation terminal 100 and receive the current time information from a time generating module such as RTC (real time clock) embedded in the mobile terminal 200. Particularly, as in the embodiment of FIG. 4B, when the navigation terminal 100 prepares to generate a warning, which reflects RGI data generated by the navigation terminal 100 and real-time weather/traffic information, the data receiving unit 510 may receive, for example, weather information transmitted from the external server 400 through the mobile terminal 200.

Accordingly, when the weather information is not included in the RGI data, the data receiving unit 510 of the warning generating apparatus 500 embedded in the navigation terminal 100 receives weather information from a separate weather server through the mobile terminal 200.

The sensor 520 senses the current travel speed of the movable body. The sensor 520 may be constructed to be included in the warning generating apparatus 500 or a travel speed sensor constructed separately may be utilized.

The data analyzing unit 530 analyzes the RGI data received from the data receiving unit 510 and determines if warning data has been included in the RGI data or not. As a result of the judgment, when the warning data has been included in the RGI data, the data analyzing unit 530 transmits the warning data to the restricted warning generating unit 540. When the warning data has not been included in the RGI data, the data analyzing unit 530 outputs general path guidance information, such as a direction instruction and a distance remaining, to the warning/guidance output unit 550 on the basis of the travel information included in the RGI data.

The restricted warning generating unit 540 determines if it will output a warning or not for the warning data transmitted from the data analyzing unit 530 based on the warning generation condition stored in advance according to the kind of the warning data. An example storage format of the warning generation condition stored in the restricted warning generating unit 540 is as shown in FIG. 5B.

Figure 5B:
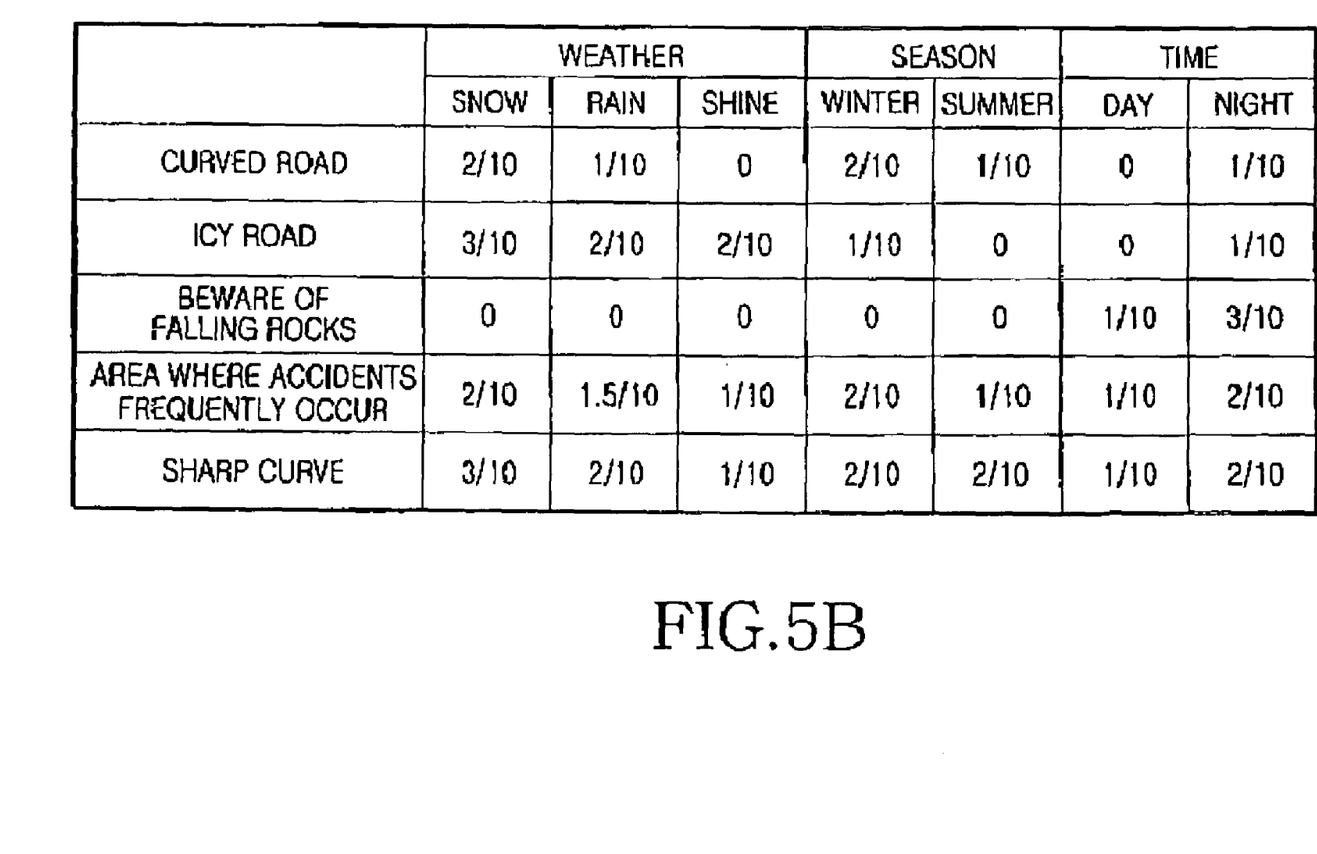
FIG. 5B is a table showing an example of storage type of a warning generation condition stored in the warning generating apparatus of the present invention.

In FIG. 5B, numerical values written in each field represent speed reduction ratios of the regulation speed set in advance. For instance, when it is snowing on a curved road for which a regulation speed is 100 km/h, the restricted warning generating unit 540 refers to the warning generation condition shown in FIG. 4B and only determines to output a warning when an actual travel speed exceeds a speed (for instance 80 km/h) decreased by 2/10 from the regulation speed set in advance. Further, there may be cases in which whether the warning is generated or not must be judged in consideration of weather, season, and time all together.

For instance, when a car passes an area of a road in which accidents frequently occur and a regulation speed of the road is 80 km/h in the daytime during a snowy winter, referring to FIG. 5B, a resultant warning generating ratio is 5/10, which is a value obtained by adding 2/10, which is a warning generating ratio when it snows in the area where accidents occur frequently, 2/10, which is a warning generating ratio of winter, and 1/10, which is a warning generating ratio of the daytime. Further, since 40 km/h is obtained when the regulation speed of the road 80 km/h is multiplied by the final warning generating ratio 5/10 and the result 40 km/h is subtracted from the regulation speed of the road 80 km/h, a warning is generated only when the car runs at a speed above 40 km/h. In this case, values in the table shown in FIG. 5B are only one embodiment of the present invention, and factors regulating the regulation speed may include not only the weather, season, time and state information of a road, but also various other factors. Further, the warning generating ratio also can be obtained in a different way from the way described above.

In order to determine if the restricted warning generating unit 540 will output the warning for the warning data or not on the basis of the warning generation condition, the restricted warning generating unit 540 knows the actual travel environment information of the movable body. For this, the restricted warning generating unit 540 receives the current travel speed of the movable body from the sensor 520 or separate travel speed sensor and receives current weather/time information from the data receiving unit 510, in order to determine the actual travel environment information of the movable body based on the current weather/time information.

The warning/guidance output unit 550 outputs the warning information, which has been transmitted from the restricted warning generating unit 540, to a driver and outputs the general path guidance information, which has been transmitted from the data analyzing unit 530, to the driver.

Figure 6A:
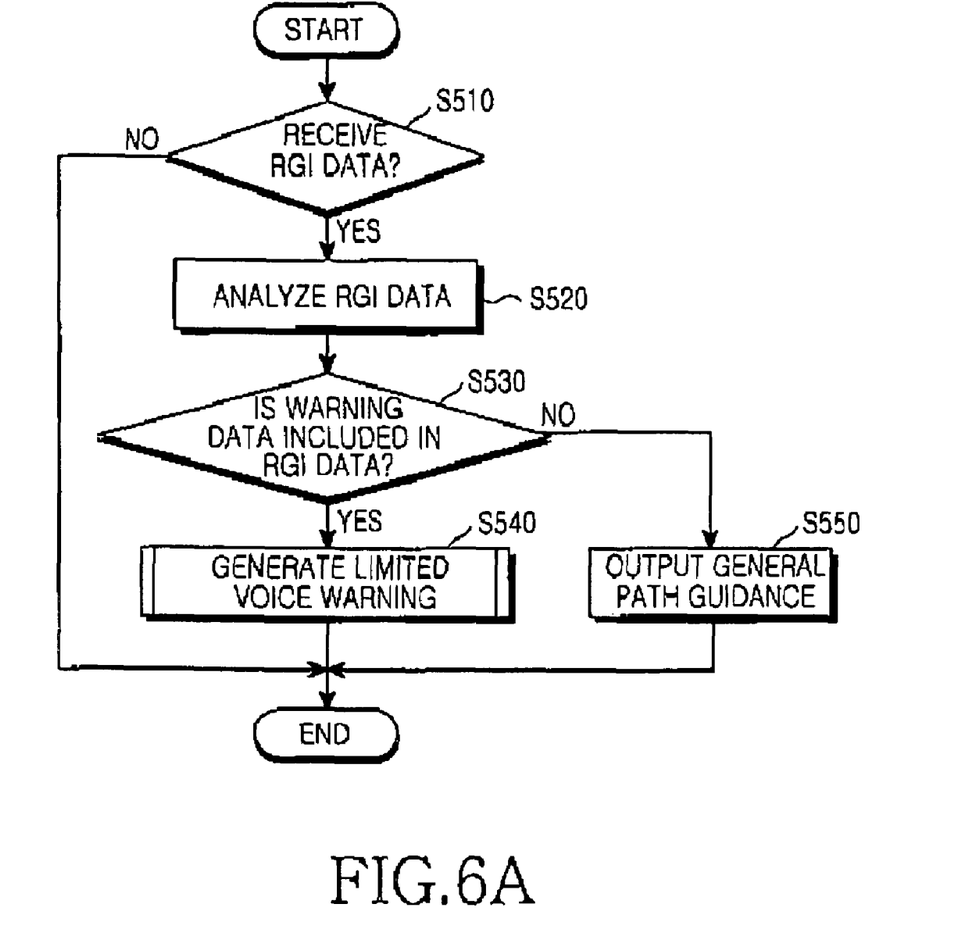
FIGS. 6A and 6B are flow charts showing a process performed by a warning generating apparatus for restrictively outputting a warning according to the first through third embodiments of the present invention.
Figure 6B:
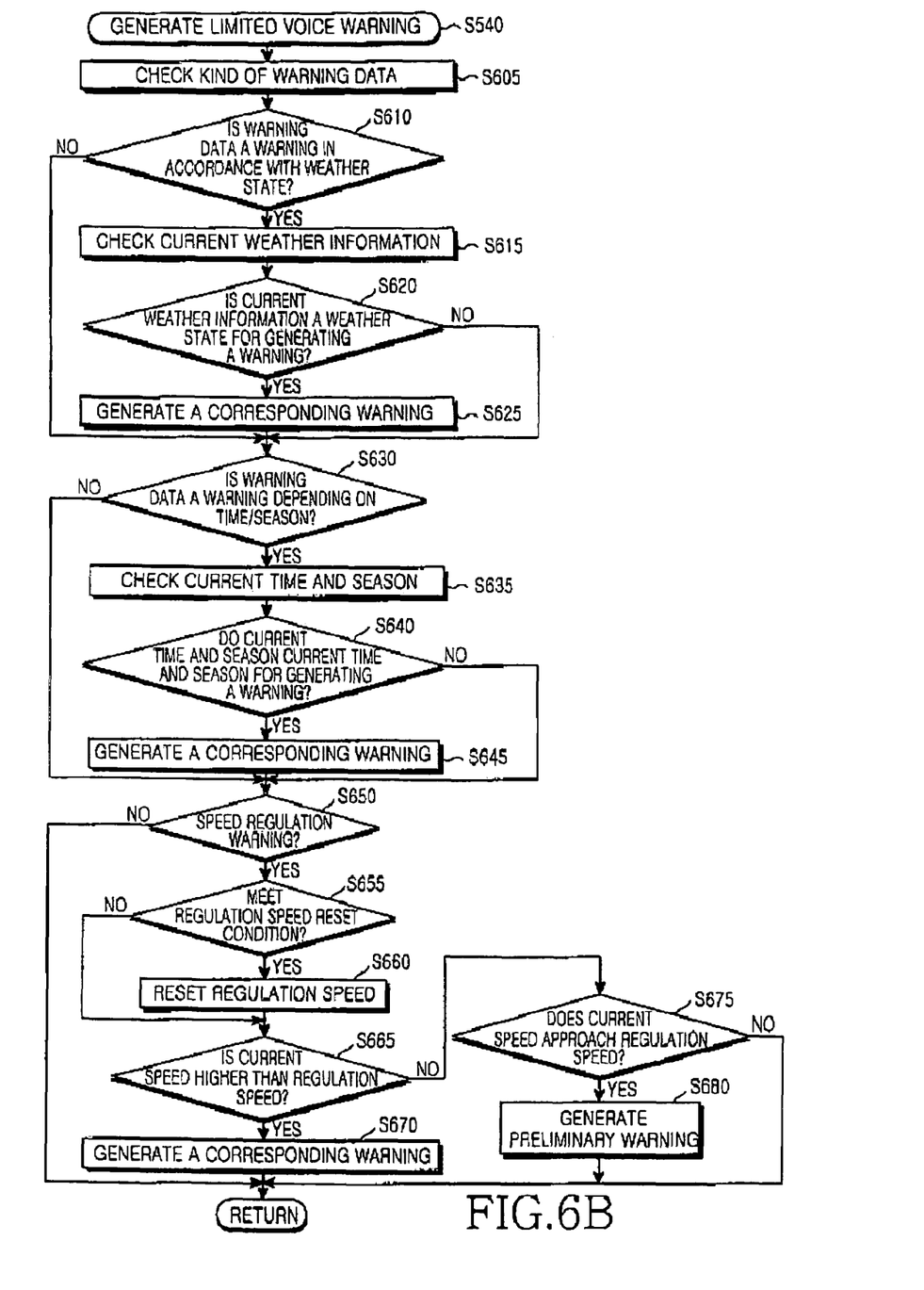

FIGS. 6A and 6B are flow charts showing a process performed by a warning generating apparatus shown in FIG. 5A according to the first and second embodiments of the present invention.

Referring to FIG. 5B and FIG. 6A, the process performed by the warning generating apparatus 500 is described. First, when the data receiving unit 510 receives the RGI data at step S510, the data analyzing unit 530 analyzes the RGI data and judges whether warning data has been included in the RGI data or not at step S520. As a result of the analysis in step S520, when warning data has been included in the RGI data, the restricted warning generating unit 540 generates a limited warning for the warning data included in the RGI data according to the already stored warning generation condition at step S540. That is, the restricted warning generating unit 540 determines if it will output the warning for the warning data included in the RGI data or not in step S530, according to the already stored warning generation condition, and then generates the limited warning according to the result of the determination whether to output the warning. As a result of the analysis in step S520, when the warning data has not been included in the RGI data, the general path guidance information such as a direction instruction and a distance remaining is outputted at step S550.

Referring to FIG. 5A and FIG. 6B, the restricted warning generating step S240 is described in detail.

As a result of the analysis in step S520 of FIG. 6A, when the warning data has been included in the RGI data, the restricted warning generating unit 540 checks the kind of the warning data at step S605. As a result of the check in step S605, when the warning data is a warning in accordance with a weather state at step S610, the restricted warning generating unit 540 checks the current weather information received from the data receiving unit 510 at step S615 and then only generates a corresponding warning at step S625 when the current weather information is determined to indicate a weather state for generating a warning at step S620.

For instance, when the warning data is limited to a particular weather state such as 'be cautious of sliding if snowing or raining', a corresponding warning is outputted according to steps S615 through S625 only when it snows or rains. Herein, the kind of the outputted warning may include either or both of a voice warning and an image warning.

As a result of the check in step S605, when the warning data is determined to be a warning depending on the time/season at step S630, the restricted warning generating unit 540 checks the current time and season using the current time information received from the data receiving unit 510 at step S635. For instance, the restricted warning generating unit 540 sets in advance reference information for identifying the season from the current time information and checks the current season by means of the reference information. Further, the restricted warning generating unit 540 only generates a corresponding warning at step S645 when the current time and season are determined to be a time and season for generating a warning at step S640.

For instance, a warning, such as 'an icy road', regarding a road state occurring only in a particular season, such as winter, is outputted only in the particular season, i.e. winter. Further, a warning regarding a road state occurring only at a particular time, such as night, is outputted only in that particular time, i.e. night. In this case, it is preferred that since sunset time is different according to season, a day/night judgment reference time table is set and utilized.

As a result of the check in step S605, when the warning data is determined to be a speed regulation warning in step S650, the restricted warning generating unit 540 determines if the current weather and season meet a regulation speed reset condition set in advance or not. When it is decided that the regulation speed set in advance needs to be reset at step S655, the restricted warning generating unit 540 resets the regulation speed set in advance at step S660. For instance, the restricted warning generating unit 540 checks a current weather state, and then resets the regulation speed as 80% of the regulation speed set in advance when it snows or rains. Accordingly, when the weather state is good and the regulation speed is 100 km/h, the restricted warning generating unit 540 resets the regulation speed as 80 km/h. Also, the restricted warning generating unit 540 may generate a corresponding warning only when a current speed is faster than the regulation speed by more than a predetermined ratio. For instance, when it is intended to output a corresponding warning only when the current speed is more than 20% faster than the regulation speed, the regulation speed is reset as 120% of the regulation speed set in advance in step S660. That is, when the regulation speed set in advance is 100 km/h, the regulation speed is reset as 120 km/h, so that the corresponding warning may be outputted only when the current speed is above 120 km/h.

Further, the corresponding warning such as a speed reduction guidance is only generated at step S670 when the current travel speed transmitted from the sensor 520 is determined to be larger than the regulation speed at step S670.

In this case, in order to prevent a driver from overspeeding unknowingly, when the current speed is determined to approach the regulation speed at step S675, a preliminary warning such as 'control the speed since the speed approaches the regulation speed' may be generated at step S680. For instance, in a case in which the regulation speed is 100 km/h when it has been set that the preliminary warning is to be generated when the current speed is above 80% of the regulation speed, the preliminary warning is outputted when the current speed is above 80 km/h.

As described above, the warning generation condition in accordance with the kind of the warning data is only an example for describing the present invention, and it can be modified variously and performed in addition to the kind of the warning data shown in FIG. 5B.

For instance, in performing a warning regarding a road state occurring in a particular time/season, voice guidance may be either omitted or generated regardless of a regulation speed according to service time/season. When warning data regards particular weather, the voice guidance may be either omitted or generated regardless of a regulation speed. When the warning data regards a predetermined temperature, warning guidance may be performed in advance before a current speed reaches the regulation speed after changing the regulation speed. That is, the warning generation conditions in accordance with the kind of the warning data may be freely set and modified according to the choice of a system operator.

As described above, according to the present invention, when a voice guidance is outputted in a navigation system, since unnecessary voice guidance is omitted in consideration of an actual travel environment of a driver, it can prevent the driver from being confused due to an overlap of various kinds of voice guidance such as a voice warning, a direction instruction and a distance remaining. That is, since unnecessary voice guidance is omitted, unpleasantness for the driver owing to the unnecessary voice guidance can be reduced. Further, according to the present invention, when a voice warning is outputted in a navigation system, since the voice warning is generated in consideration of the actual travel environment of the driver such as a travel speed and actual season/weather/time information, the travel environment of the driver can be improved. Further, since the present invention outputs restrictively the voice guidance to the driver, it can more effectively utilize the navigation system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A warning generating apparatus for generating a warning in a navigation system, the apparatus comprising:
    a data receiving unit for receiving route guidance information data including path information to a destination and current weather information;
    a data analyzing unit for determining whether warning data has been included in the route guidance information data outputted from the data receiving unit;
    a sensor for sensing a current travel speed of a movable body;
    a restricted warning generating unit for receiving the route guidance information data from the data analyzing unit if the route guidance information data includes the warning data, for receiving the current travel speed from the sensor, and for determining whether the restricted warning generating unit will output a warning for the warning data based on the current travel speed, the warning data, the current weather information and warning generation conditions stored in advance corresponding to a type of the warning data; and
    a warning/guidance output unit for outputting the warning corresponding to the warning data, when the restricted warning generating unit determines to output the warning,
    wherein the warning data and the warning generation conditions include data for weather conditions and regulation speed.

2. The warning generating apparatus as claimed in claim 1, wherein, when the current weather information is snow or rain, the regulation speed is reduced.

3. The warning generating apparatus as claimed in claim 1, wherein the data receiving unit receives route guidance information data which further includes current time information.

4. The warning generating apparatus as claimed in claim 1, wherein the data receiving unit receives the route guidance information data which further includes road information representing danger information.

5. The warning generating apparatus as claimed in claim 1, wherein the sensor further includes a speed sensor which is installed on a predetermined position of the movable body and which senses the travel speed of the movable body.

6. The warning generating apparatus as claimed in claim 1, wherein the sensor receives the travel speed of the movable body from a speed sensor which is installed on a predetermined position of the movable body and which senses the travel speed of the movable body.

7. The warning generating apparatus as claimed in claim 1, wherein the restricted warning generating unit further
receives route guidance information data having current time/weather information from the data receiving unit and receives the current travel speed of the movable body from the sensor,
determines actual travel environment information of the movable body,
checks the warning data transmitted from the data analyzing unit,
compares warning generation conditions corresponding to the checked warning data with the actual travel environment information,
determines to output a warning only when the actual travel environment information satisfies the warning generation conditions corresponding to the warning data, and
outputs the warning information to the warning/guidance output unit if it is determined to output the warning.

8. The warning generating apparatus as claimed in claim 1, wherein when the route guidance information data does not include warning data when the route guidance information data is transmitted from the data analyzing unit, the warning/guidance output unit general path guidance information based on the route guidance information data.

9. A warning generating method for generating a warning of a navigation system, the method comprising the steps of:
receiving route guidance information data including path information to a destination and current weather information;
determining whether warning data has been included in the received route guidance information data;
checking a kind of the warning data when the warning data has been included in the route guidance information data;
determining if a warning corresponding to the warning data will be outputted, based on the checked kind of the warning data, based on warning generation conditions stored in advance according to the kind of the warning data and based on the current weather information; and
outputting the warning corresponding to the warning data when it is determined to output the warning,
wherein the warning data and the warning generation conditions include data for weather conditions and regulation speed.

10. The warning generating method as claimed in claim 9, wherein the received route guidance information data includes current time information.

11. The warning generating method as claimed in claim 9, wherein the received route guidance information data includes the regulation speed and road information.

12. The warning generating method as claimed in claim 9, wherein the determining step further comprises the steps of:
receiving current weather/time information and a current travel speed of a movable body and determining actual travel environment information of the movable body;
comparing warning generation conditions corresponding to the checked kind of the warning data with the actual travel environment information; and
determining to output a warning only when the actual travel environment information satisfies the warning generation conditions corresponding to the checked kind of the warning data.

13. The warning generating method as claimed in claim 9, further comprising the step:
outputting general path guidance information based on the route guidance information data when the warning data has been included in the received route guidance information data.

14. A navigation system, comprising:
a warning generating apparatus for restrictively outputting a warning based on actual travel environment information of a movable body,
wherein the warning generating apparatus further comprises:
a data receiving unit for receiving route guidance information data including path information to a destination and current weather/time information, and for outputting the route guidance;
a data analyzing unit for determining whether warning data has been included in the route guidance information data outputted from the data receiving unit or not;
a sensor for sensing a current travel speed of a movable body;
a restricted warning generating unit for receiving the route guidance information data from the data analyzing unit if the route guidance information data is determined to include the warning data, and for determining whether the restricted warning generating unit will output a warning for the warning data based on warning generation conditions stored in advance according to a kind of the warning data and current weather information; and
a warning/guidance output unit for outputting warning information when the warning information has been transmitted if the restricted warning generating unit has determined to output a warning,
wherein the warning data and the warning generation conditions include data for weather conditions and regulation speed.

15. The navigation system as claimed in claim 14, wherein the data receiving unit receives route guidance information data which further includes current weather information.

16. The navigation system as claimed in claim 14, wherein the data receiving unit receives route guidance information data further includes current time information.

17. The navigation system as claimed in claim 14, wherein the data receiving unit receives route guidance information data further includes road information representing danger information.

18. The navigation system as claimed in claim 14, wherein the sensor includes a speed sensor which is installed on a predetermined position of the movable body and senses a travel speed of the movable body.

19. The navigation system as claimed in claim 14,
wherein the sensor receives the travel speed of the movable body from a speed sensor which is installed on a predetermined position of the movable body and which senses the travel speed of the movable body.

20. The navigation system as claimed in claim 14,
wherein the restricted warning generating unit further
receives the current travel speed of the movable body from the sensor unit and determines actual travel environment information of the movable body,
checks the warning data transmitted from the data analyzing unit,
compares warning generation conditions corresponding to the actual travel environment information,
determines to output the warning only when the actual travel environment information satisfies the warning generation conditions corresponding to the warning data, and
outputs the warning information to the warning/guidance output unit if it is determined to output the warning.

21. The navigation system as claimed in claim 14,
wherein when the route guidance information data does not include warning data when the route guidance information data is transmitted from the data analyzing unit, the warning/guidance output unit outputs general path guidance information based on the route guidance information data.

* * * * *